United States Patent [19]

Raymond

[11] 4,047,644
[45] Sept. 13, 1977

[54] POWDER FLUIDIZER WITH FEED FOR CONSTANT POWDER LEVEL

[76] Inventor: Fernand Raymond, 38330 chemin du Manival, Saint-Ismier, France

[21] Appl. No.: 613,421

[22] Filed: Sept. 15, 1975

[30] Foreign Application Priority Data

Oct. 9, 1974 France .................................. 74.34715

[51] Int. Cl.$^2$ ............................................ B65D 83/06
[52] U.S. Cl. .................................. 222/193; 222/450; 302/49; 302/53
[58] Field of Search ....................... 302/42, 52, 54, 49, 302/53; 222/56, 64, 67, 68, 193, 450, 453, 367

[56] References Cited

U.S. PATENT DOCUMENTS

| | | | |
|---|---|---|---|
| 528,417 | 10/1894 | Duckham | 302/54 |
| 2,326,276 | 8/1943 | Avedikian | 222/193 X |
| 2,692,707 | 10/1954 | Maxwell | 222/450 X |
| 3,110,420 | 11/1963 | Brewer | 222/56 |
| 3,412,898 | 11/1968 | Marynowski | 222/193 X |
| 3,946,913 | 3/1976 | Merman | 222/453 |

Primary Examiner—Robert B. Reeves
Assistant Examiner—David A. Scherbel
Attorney, Agent, or Firm—Brisebois & Kruger

[57] ABSTRACT

The invention relates to a distributor-container for supplying powdered solid products or the like to a utilization apparatus such as an electrostatic powder projector, in which a substantially constant level of powder and therefore a substantially constant rate of flow of fluidized powder, is maintained in the distributor-container irrespective of the height of the fluidized powder in an outer container in which the distributor-container is immersed. The two containers are connected through a lock-chamber located at the height of said constant level, and closure members for the ends of the lock-chamber operate so as to introduce powder into the distributor container only when the level of powder in the distributor container is below the uppermost level of the powder in the end of the lock-chamber opening into the distributor-container.

7 Claims, 4 Drawing Figures

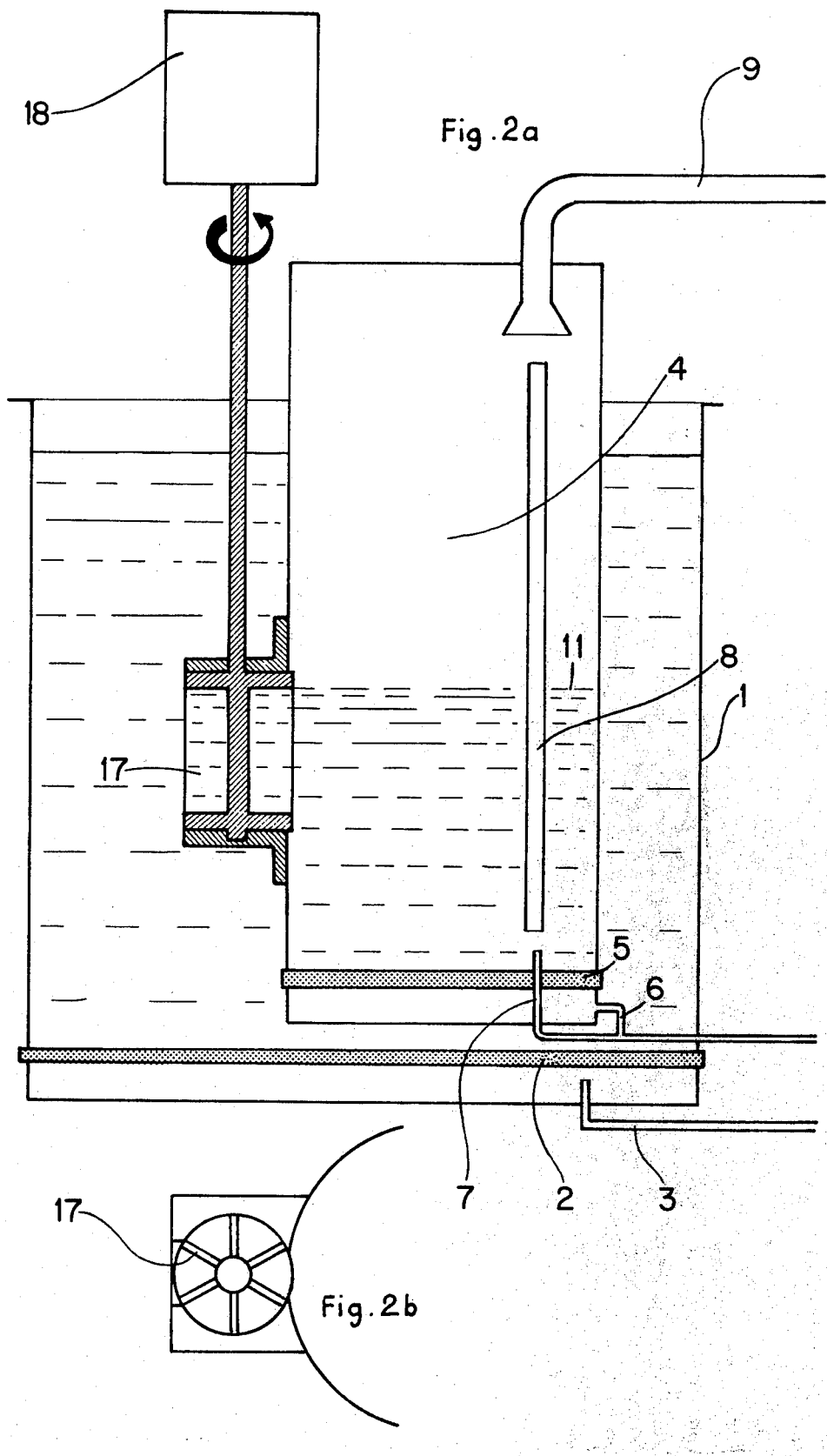

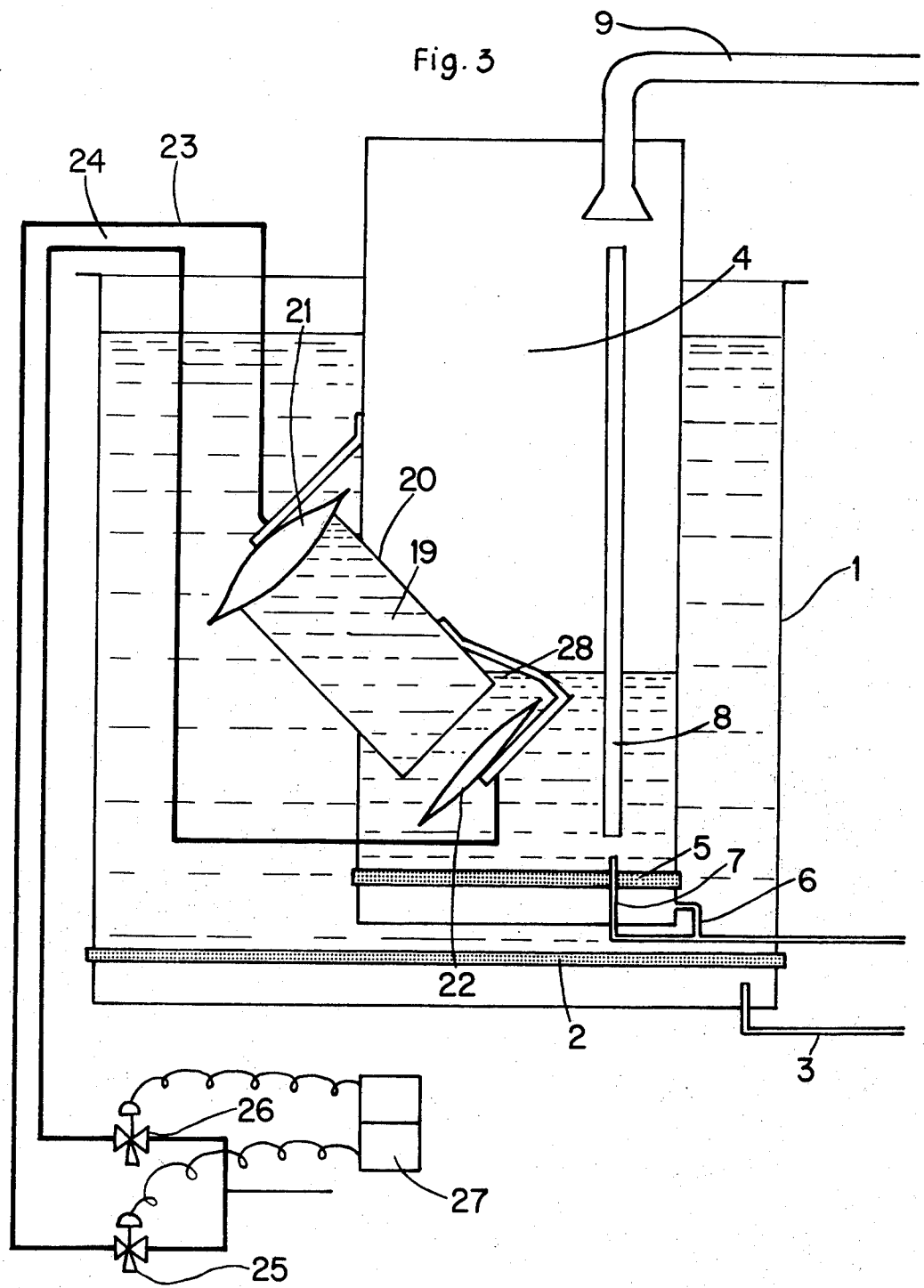

POWDER FLUIDIZER WITH FEED FOR CONSTANT POWDER LEVEL

The present invention relates to a distributor-container intended for supplying a powdered solid product, or similar product such as a fibrous product, to a utilization device such as for example a powdering or flocking apparatus.

Known devices of this kind usually comprise:

A container or tank in which the powder is fluidized;

a continuous or alternating device for supplying fresh powdered solid product to this container;

a device for extracting the powder from the said container and sending it to the utilization apparatus, the said extraction device being generally constituted by a Venturi if the container is open to the air and by a pressure application system if the container is of the closed type, or "under pressure".

It has always been found that the flow-rate of powder or the like supplied by such distributor-containers depended largely on the level of the fluidized powder in the said containers, which is quite understandable if account is taken of the hydrostatic pressure due to the column of fluidized powder. For example, if for a certain flow-rate of extraction air, a flow-rate of 10 kilograms per hour of powder is obtained when the distributor-container is full of fluidized powder, this flow-rate only amounts to 8.5 kg/hr when the said container is half full.

In accordance with the French Certificate of Utility No.71/40213, published under the No. 2,159,182, it has already been proposed to provide such distributor-containers with a float system permitting the control of the supply device of the container in such manner as to maintain a constant level of fluidized powder in the said tank.

Devices of this kind have proved very difficult in technological construction; they are complicated, of doubtful reliability and very expensive.

The device in accordance with the invention makes it possible to produce a distribution-container for powder or the like having a substantially constant level of fluidized powder, the device being of particularly simple construction, entirely reliable and relatively inexpensive. It is characterized in that the device for supplying fresh product to the distributor-container is constituted by a lock-chamber located at a desired height level of fluidized product.

The invention will be more clearly understood with the aid of the description which follows below of three examples of construction, reference being made to the accompanying drawings, in which:

FIGS. 2a and 2b represent diagrammatically a form of embodiment of the invention utilizing a rotating lock-gate;

FIG. 3 shows diagrammatically a form of embodiment of the invention more particularly intended for the utilization of thermoplastic powders employing a lock-gate mounted in an oblique manner.

Figure 1:
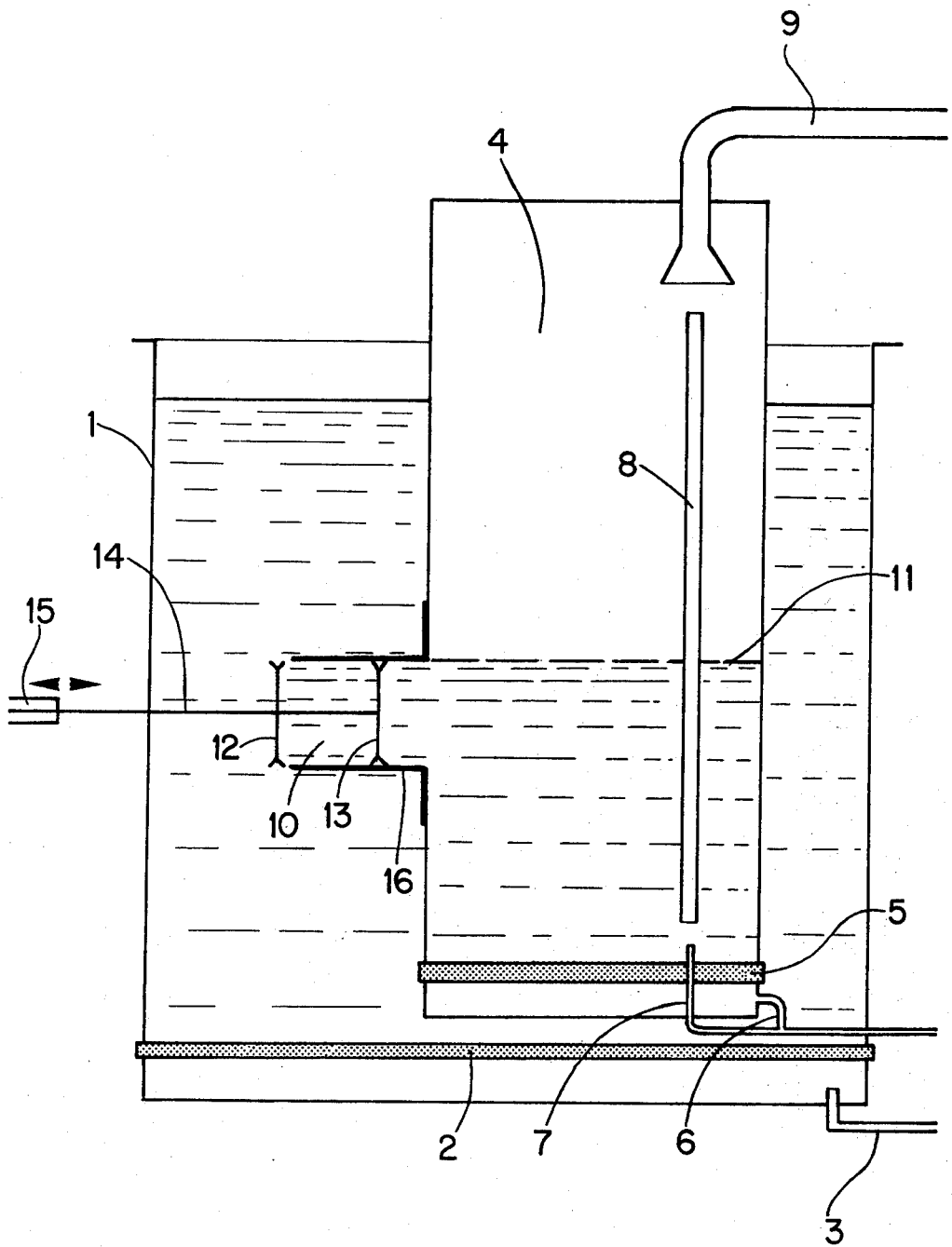
FIG. 1 shows diagrammatically one form of embodiment of the invention utilizing a horizontal lock-gate.

In FIG. 1, the reference numeral 1 represents a storage tank for fluidized powder, the reference numeral 2 indicates the fluidization plate fitted on the tank 1 and the reference 3 represents the inlet conduit for the fluidization air. The tank 1 is open at the top, so that it is easy to pour the fresh powder into it when so desired.

Partly or totally immersed in the tank 1 is provided an extraction device 4 for fluidized powder, constituting the distributor-container for powder according to the invention. In a manner known per se, the distributor-container 4 which, in the example described here is of the under-pressure type, comprises a fluidization device with a fluidization plate 5 and a fluidization air inlet 6, together with a device for ejection by putting under pressure, comprising an intake 7 for ejection air, a guiding tube 8 and an extraction conduit 9 leading to a utilization apparatus, such an electrostatic powdering apparatus, for example. It will be understood that the extraction device 4 could also be of the "free air" type; in this case, it could not be wholly immersed in the tank 1, and the actual extraction would be effected by a Venturi, in a manner known per se.

In accordance with the invention, the distributor-container 4 is supplied with fresh powder from the tank 1 through a lock-chamber 10 which has been placed at a constant-level height 11, which it is desired to maintain in the distributor-container 4, as indicated on the drawing.

In the example of FIG. 1, the lock-gate of horizontal type is simply constituted by two discs 12 and 13, placed at a fixed distance from each other on a shaft 14 which is given a reciprocating movement by a pneumatic jack 15. The discs 12 and 13 slide in a fluid-tight manner inside a tubular channel 16 constituting the lock-chamber of the lock-gate 10 and thus effecting the coupling between the distributor-container 4 and the tank 1.

In order that the lock-gate 10 may function correctly, that is to say in the same way as a real lock-gate, it is necessary that the distance between the discs 12 and 13 should be equal to or less than the length of the lock-chamber 16, and that the to-and-fro movement of the shaft 14 should have sufficient amplitude to enable the disc 12 to disengage itself from the channel 16 towards the tank 1 in the withdrawn position and to enable the disc 13 to disengage itself from the channel 16 towards the distributor-container 4 in the forward position.

The operation of the device is as follows:

The distributor-container 4 is assumed to function continuously and therefore to supply through the outlet conduit 9 a certain flow-rate D of powder to the utilization apparatus. The to-and-fro movement of the shaft 14 has a fairly high frequency, in order that the lock-gate 10 can supply to the distributor-container 4 a flow-rate of powder greater than the flow-rate D from the said container. If the level of fluidized powder falls below the level 11, corresponding in the drawing to the upper portion of the lock-chamber 16, the lock-gate 10 supplies fresh powder to the container 4 so that the level in the container 4 rises. When the level 11 is reached, by virtue of the elementary principles of hydrostatics, the lock-gate 10 can supply to the container 4 only a quantity of powder to ensure a constant level of powder 11, since this level 11 corresponds to the maximum height of powder in the lock-gate 10 itself. In normal operation, the level is therefore maintained constant at the value 11 corresponding to the upper level of the powder in the lock-gate itself.

FIGS. 2a and 2b show diagrammatically a form of embodiment similar to that of FIG. 1, but in which the horizontal lock-gate has been replaced by a rotatable lock-gate 17 of a type known per se, driven in rotation by a motor 18. The speed of rotation of the lock-gate 17 must be such that it can provide, as in the previous case, a flow-rate of powder greater than that extracted from the distributor-container 4. The operation of this arrangement is identical to that of FIG. 1, and the references indicating identical parts are the same as those of FIG. 1.

The form of embodiment shown diagrammatically in FIG. 3 is more particularly intended for the case of the utilization of thermoplastic powders. As is well known, these powders tend to melt or polymerize if they are subjected to friction, and it is therefore not advisable to use for such powders, lock-gates in which the powder is displaced by mechanical means, as is the case for the lock-gates of FIGS. 1 and 2. The thermoplastic powder must therefore be displaced from one side of the lock-gate to the other by purely hydraulic means, which enables the proposed system to be produced by way of example as shown in FIG. 3.

In this latter figure, in which, as in FIG. 2, the same reference numbers indicating identical members are the same as those of FIG. 1, the communication between the tank 1 and the distribution-container 4 is effected by means of an inclined lock-gate 19 comprising a main body 20 and two end clapper-valves 21 and 22. The valves 21 and 22 are of the pneumatic type and are supplied respectively with compressed air for closure and opening by the conduits 23 and 24. The supply of compressed air to the conduits 23 and 24 is effected cyclically by means of two electro-valves 25 and 26 supplied in push-pull by each of the outlets of a control 27, the electrical cycle of which permits sufficient time-delay so that the clapper-valves 21 and 22 are never open at the same time, but are opened in succession. The constant level 11 then obtained is at the height of the highest extremity 28 of the most downstream section of the lock-chamber 20, as can be seen from the drawing.

The operation of the device shown in FIG. 3 is as follows:

When the level of fluidized powder in the distributor-container 4 is lower than the level of the extremity 28, during the opening phases of the clapper 22, there is nothing to prevent the fresh powder contained in the main body 20 from flowing into the container 4. When the powder level in the container 4 has reached a value 11 slightly higher than the level of the extremity 28, the powder accumulated during the course of the following cycle in the lock-chamber 20 can no longer flow into the container 4 by virtue of the elementary laws of hydrostatics, as has been shown in the drawing.

The lock-gate can therefore no longer supply fresh powder to the container 4, until the powder level has fallen again below the level of the extremity 28. At that moment, a definite quantity of powder is supplied which causes the level to rise again up to the value 11 shown in the drawing, and so on. With sufficiently small dimensions of the lock-gate with respect to those of the distributor-container 4, the level in this latter thus oscillates about values corresponding to the levels 11 and 28, and is therefore in practice maintained at a constant level.

The invention can be utilized in all kinds of industries which use powdered solid products or like products such as fibres. It is more particularly adapted to the industry of coating objects by electrostatic powdering or flocking.

What I claim is:

1. A distributor for supplying powdered solid products to apparatus utilizing such products, said distributor comprising:
   a first container to which said product is supplied,
   a second container from which said product is delivered to said apparatus,
   means for fluidizing the powdered solid product in both containers,
   and means for maintaining the level of said product in said second container at approximately a predetermined level, said means for maintaining the level of said product comprising at least one lock-chamber connecting said first and second containers, said lock-chamber comprising an inlet to said second container, the upper portion of said inlet terminating in said second container at said desired level, together with means for opening said at least one lock chamber alternately to one of said containers and then to the other but preventing the formation at any time of an open passage from one container through said lock chamber to said other container.

2. A distributor as claimed in claim 1, in which said opening means is a horizontal gate.

3. A distributor as claimed in claim 1, in which said opening means is a rotating gate.

4. A distributor as claimed in claim 1, in which said opening means comprises a lock-gate with clapper-valves mounted in an oblique position.

5. A distributor as claimed in claim 1, in which said utilizing apparatus is a powdering or flocking apparatus.

6. Distributor as claimed in claim 1 in which the maximum volume of flow through said lock-chamber per unit time is greater than that at which said product is delivered to said apparatus.

7. A distributor for supplying powdered solid products to apparatus utilizing such products, said distributor comprising:
   a first container to which said product is supplied,
   a second container from which said product is delivered to said apparatus,
   means for fluidizing the powdered solid product in both containers,
   and means for maintaining the level of said product in said second container at approximately a predetermined level, said means for maintaining the level of said product comprising a connection between said containers, said connection including an upper portion terminating at said predetermined level and transfer means for alternately moving product adjacent said connection from said first container toward said second container and from said second container toward said first container, so that there is a net movement of product from said first container toward said second container only when the level of said product in said second container is below said predetermined level so that the amount of product in said second container adjacent said connection and thus available for transfer is less than in said first container.

* * * * *